United States Patent
Hellum et al.

(10) Patent No.: US 6,742,063 B1
(45) Date of Patent: May 25, 2004

(54) METHOD AND APPARATUS FOR EFFICIENT TRANSFER OF DATA PACKETS

(75) Inventors: Pål Longva Hellum, Sandvika (NO); Bjørn Kristian Kleven, Bødalen (NO)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 332 days.

(21) Appl. No.: 09/614,249

(22) Filed: Jul. 12, 2000

(30) Foreign Application Priority Data

Jul. 15, 1999 (NO) .......................................... 19993483

(51) Int. Cl.[7] .............................................. G06F 13/38
(52) U.S. Cl. .............................. 710/66; 710/39; 710/40; 710/52; 710/53; 710/71; 710/307; 710/310; 710/313; 710/315
(58) Field of Search .............................. 710/39, 40, 52, 710/53, 71, 66, 307, 310, 313, 315

(56) References Cited

U.S. PATENT DOCUMENTS

| | | | |
|---|---|---|---|
| 5,255,239 A | | 10/1993 | Taborn et al. |
| 5,297,207 A | * | 3/1994 | Degele .......................... 380/46 |
| 5,615,382 A | * | 3/1997 | Gavin et al. .................... 710/53 |
| 5,627,797 A | | 5/1997 | Hawkins et al. |
| 5,673,396 A | | 9/1997 | Smolansky et al. |
| 5,712,992 A | | 1/1998 | Hawkins et al. |
| 5,724,583 A | | 3/1998 | Carmon et al. |
| 5,768,546 A | * | 6/1998 | Kwon ........................... 710/307 |
| 5,832,310 A | * | 11/1998 | Morrissey et al. ............. 710/71 |
| 5,889,948 A | | 3/1999 | Smolansky et al. |
| 6,145,100 A | * | 11/2000 | Madduri ........................ 714/45 |
| 6,211,890 B1 | * | 4/2001 | Ohba ........................... 345/506 |
| 6,240,481 B1 | * | 5/2001 | Suzuki ......................... 710/313 |
| 6,363,076 B1 | * | 3/2002 | Allison et al. ............... 370/419 |
| 6,449,678 B1 | * | 9/2002 | Batchelor et al. ........... 710/310 |
| 6,457,091 B1 | * | 9/2002 | Lange et al. ................. 710/314 |
| 6,460,108 B1 | * | 10/2002 | McCoskey et al. ......... 710/310 |

OTHER PUBLICATIONS

Cypress homepage—"Build a FIFO 'Dipstick' With a CY7C371i CPLD".
Cypress homepage—"Use a PLD and FIFOs to Convert Bus Width".
Cypress homepage—"FIFO Dipstick Using Warp2® VHDL and the CY7C371".
Cypress homepage—"Designing With CY7C436xx Synchronous FIFOs" Feb. 1999.
Texas Instruments "Interfacing TI Clocked FIFOs With TI Floating–Point Digital Signals Processors" Mar. 1996.

* cited by examiner

Primary Examiner—Jeffrey Gaffin
Assistant Examiner—Niketa Patel
(74) Attorney, Agent, or Firm—Nixon & Vanderhye P.C.

(57) ABSTRACT

In a data processing system, the effective speed of transferring data packets between a data processing unit and various other devices with different performance characteristics is improved by a data transfer method and a packing and buffering device, thus offloading the data processing unit or the various devices. FIFO buffers provide intermediate storage of transfer data, and packing and unpacking modules ensure efficient use of bus widths that are different on the data processing side and the device side. Data packet transfer control is effected using a control and status module with a common byte counter, and a direct transfer is facilitated via a supplementary direct data path between the data processing unit and other devices.

28 Claims, 2 Drawing Sheets

METHOD AND APPARATUS FOR EFFICIENT TRANSFER OF DATA PACKETS

BACKGROUND OF INVENTION

The present invention is related to the area of data transfer between units within or connected to a system for data processing, and, in particular, to a method and apparatus for efficient transfer of data in data processing systems comprising devices and other units with data buses which are operating at different speeds. More particularly the invention is related to a method and apparatus for efficient transfer of data packets or data organised in blocks between devices with low-speed interfaces that are interfaced to a high-performance central processing unit (CPU) system bus.

In modern data processing systems the need for rapidly transferring large amounts of data continues to increase, and new and fast growing technologies that make use of such data processing systems such as e.g. the Internet and digital telephony which have become available to the public has spurred a further growth in research and development in the field of low and moderate cost high-performance computers with enhanced capabilities. As the new high-performance CPU systems have become commonplace at low cost, one of the obstacles that have been met in taking on the challenges of this field is to efficiently make use of the abilities of new high-performance CPU systems to communicate by rapid data transfer. Such enhanced data transfer to and from the devices found in the environment of these high-performance CPU systems is needed to communicate further with networks, other peripheral devices and the like and to bridge the performance gaps that may exist between these units and devices.

In prior art data systems, interfacing of low-speed devices to high-performance CPU systems for improving the input/output (I/O) and data transfer have usually been accomplished by means of either interrupts, direct memory access (DMA) or a combination of the two. However, these methods suffer from problems related to the fact that the limitations of the low-speed devices still affect possibility for efficiently gaining access to and making full use of the higher speed CPU bus. Interrupt driven systems show low latency, but handling of interrupt routines is time consuming and will consequently put severe limitations on the up-scaling of such systems. The DMA driven systems are better in that respect, but the limitations of the low-speed device itself are still transparent to the high-speed CPU bus.

In addition to the above mentioned commonly employed interrupts and DMA means for improving data transfer in high-performance CPU systems, other means have been developed to address the problem of providing high-efficiency data transfers in various systems encountering higher needs for data throughput. In U.S. Pat. No. 5,862,128 to Cooperman et. al., a digital circuit switch is disclosed which, in order to solve a throughput problem at peak traffic conditions, makes use of a single merged buffer that is outside the circuit switch fabric to temporarily store correctly and incorrectly routed signals which subsequently are sent to the correct destination when the output port is no longer busy. The problem of interconnecting systems with different properties is addressed in U.S. Pat. No. 561,002 to Van Seters et. al. which discloses a device and a method for internetworking whereby a translation of data packet headers is accomplished in a process which involves separating the data packet header from the data packet itself. U.S. Pat. No. 5,764,895 to Chung, discloses a local area network (LAN) method and device for directing data packets in a LAN, wherein the disclosed LAN device has a plurality of ports interconnected by a high-speed communication bus. Finally, two Japan patent publications no.JP 9319680A and JP 11011387A disclose, respectively, an invention for improvement in utilisation of buffer memory by use of a single buffer memory for forwarding the same data to a number of processing units in a system which includes several processing units and an invention for prevention of transmission of excess data packets between a pair of data-processing systems by control of receiving buffers provided in the bus controllers in each of the systems. Although the above mentioned disclosures and prior art methods address different aspects of efficient data transfer and data throughput, the problem that still remains to be solved is that of providing new improvements in efficient interfacing of low-speed devices or devices that have different data transfer performance characteristics to a central processing unit (CPU) system bus such as a high-performance central processing unit (CPU) system bus for transferring of packet-oriented data in a data processing system.

BRIEF SUMMARY OF INVENTION

It is therefore an object of the present invention to provide a method whereby data packets can be transferred efficiently between devices provided with data transfer interfaces and a high-performance central processing unit (CPU) system bus in data processing systems in which the devices and the CPU bus have different data transfer performance characteristics.

It is a further object of the present invention to provide a device capable of efficiently transferring data packets between devices provided with data transfer interfaces and a high-performance central processing unit (CPU) system bus in data processing systems in which the devices and the CPU bus have different data transfer performance characteristics.

It is a further object of the invention to provide isolation between a low-speed device and a high-speed device, thus making the high-speed device insensitive to the interfaces of the low-speed device. At the same time data is packed and shipped in a format for optimal data transfer on the high-speed CPUs bus. Altogether, the high-speed CPU is loaded to a very low degree even though the interfaced devices are slow. Since the method is very well suited for instansiation it lends itself to scaling, and several low-speed devices may thus be added to a system without impairing the overall performance.

These and other objects of the present invention are accomplished by the method and the device according to the present invention disclosed herein and as set out in the accompanying patent claims.

The present invention is particularly suitable in situations where data is transferred in blocks. This is the case for e.g. devices interfacing to the Internet where data is packet oriented.

BRIEF DESCRIPTION OF DRAWINGS

In the following, the invention will be described by way of example as described in the following which can be better understood when read in conjunction with the accompanying figures where.

DETAILED DESCRIPTION

In the following a low-speed device will refer to a device with low-speed interfaces with respect to the high-speed CPU. The low-speed (interface) device itself may have still a very high processing capability such as a digital signal processor (DSP) shown in FIG. 1.

Now with reference to FIG. 1, some of the features and advantages of the present invention will be explained.

Figure 1:
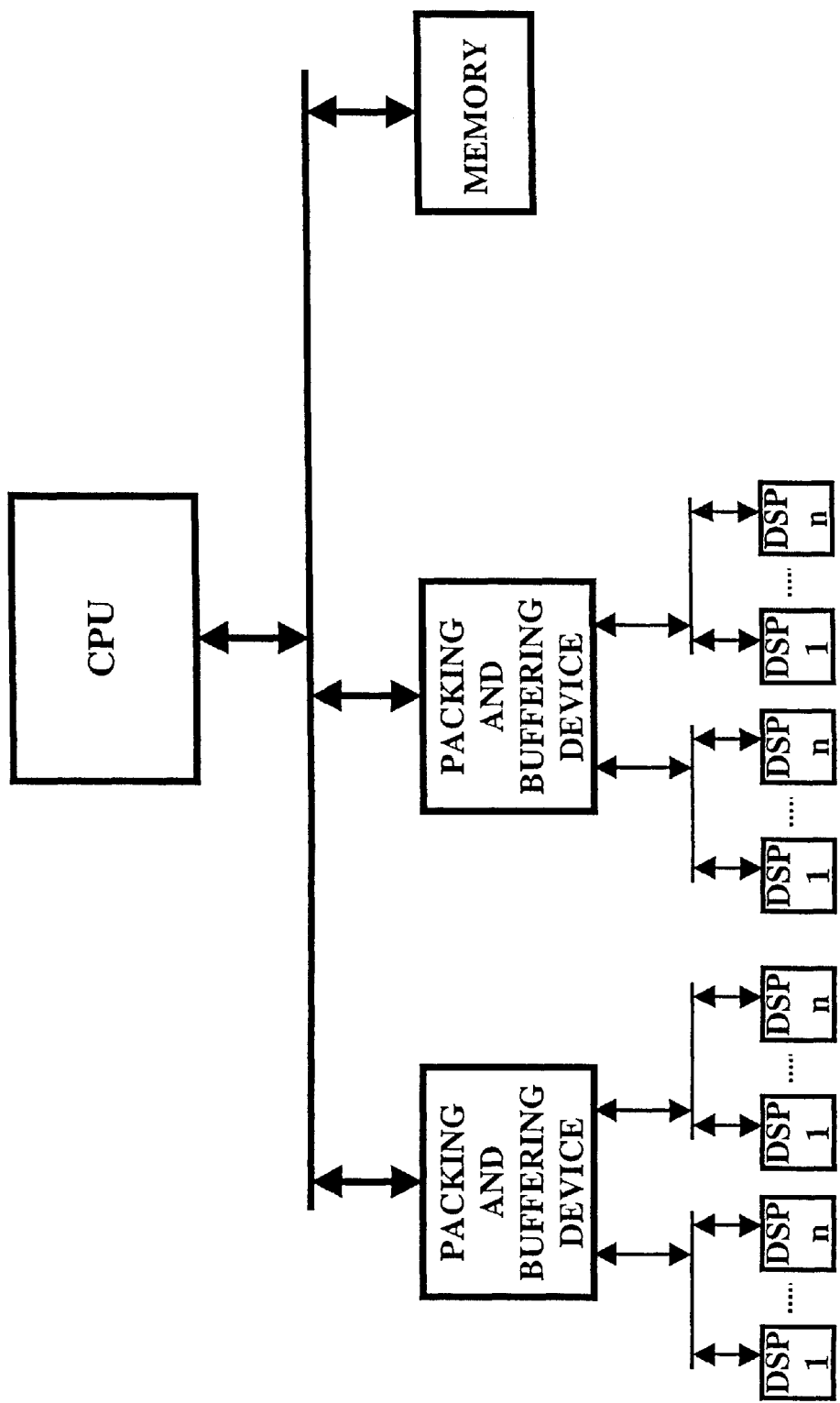
FIG. 1 is a schematic drawing of an exemplary embodiment of a data processing system according of the present invention.

The present invention solves a problem where one or several low-speed devices are interfaced to a high-speed CPU such as the exemplary system shown in FIG. 1. The low-speed device may reduce the performance of the high-speed CPU bus and thus prevent the scaling of the system to the desired input/output I/O and processing capacity.

Overall input/output (I/O) and processing performance is increased by adding packing and buffering devices between the high-speed CPU bus and the low-speed devices. The number of low speed devices determines how many packing and buffering devices are needed in a complex system. In the following, with reference to FIG. 1, is given an example on how to use the packing and buffering device according to the invention with several DSP's connected to a high-speed CPU system. In this case, the packing and buffering device interfaces to two groups of low-speed devices.

It is normally necessary to insert buffers between the high speed CPU and the low-speed device to reduce capacitive loading on the high speed CPU bus. The addition of the packing and buffering device is therefore not normally a significant overhead as far as cost and board space is concerned. In addition to increasing the speed of the CPU-bus the reduced capacitive loading reduces power consumption as a smaller number of connected devices are involved in the bus transactions.

Now by referring to FIG. 2 the invention will in the following by way of example be described in more detail.

The packing and buffering device consists of a low-speed direct data path and a high-speed packet data path.

The direct data path is the connection you normally have when connecting a low-speed device to a high-speed CPU bus. This is simply a buffered path to the low-speed device. The direct data path is used to access the low-speed device for any data transfers which are not packet based data transfers.

Figure 2:
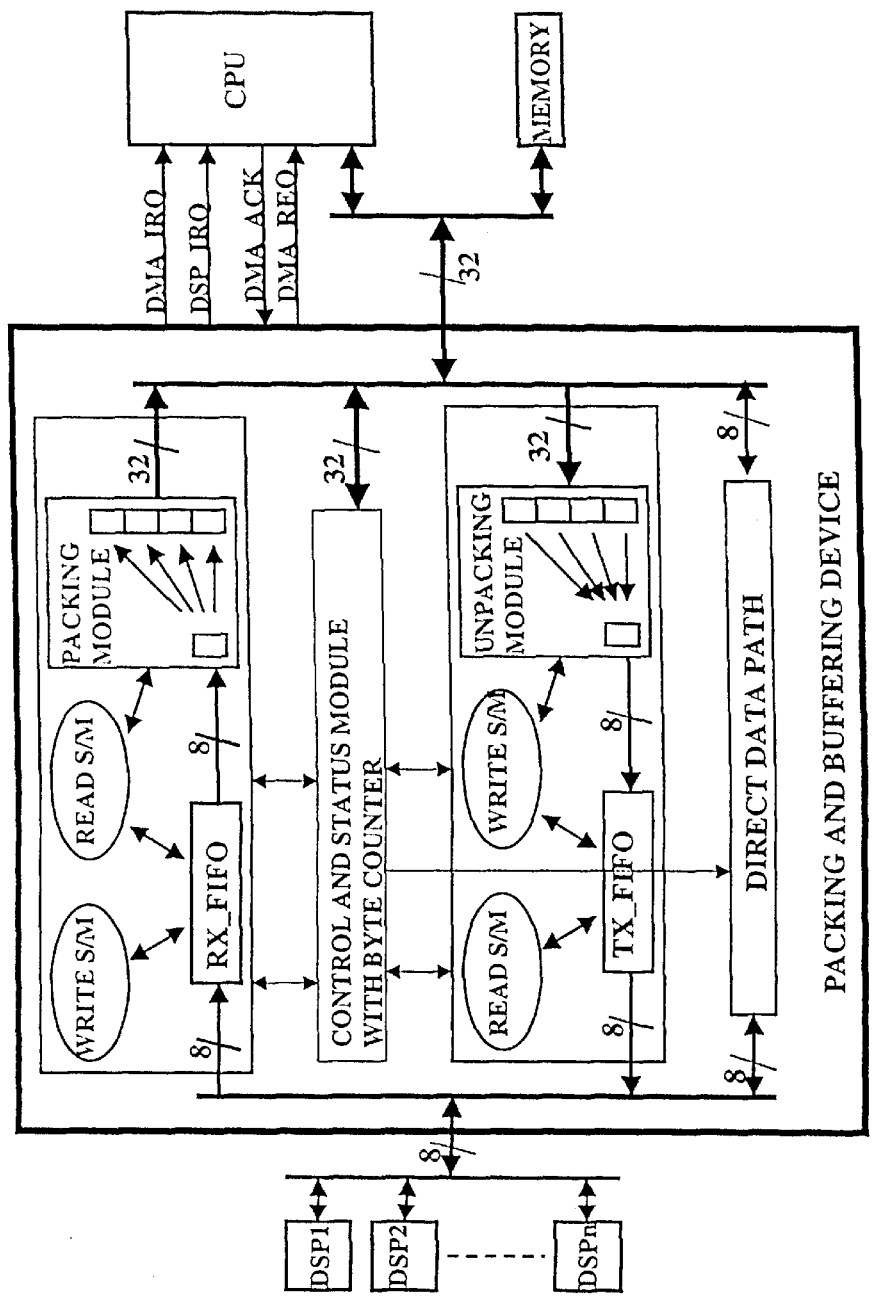
FIG. 2 is a detailed schematic of an exemplary embodiment of a packing and buffering device according to the present invention.

The intention with the packet data path, as shown in the example of FIG. 2, is to enable efficient data transfers from/to the low-speed device to/from the high-speed CPU memory. This is achieved by de-coupling the process of data transfer to/from the low-speed device from the process of data transfer from/to the high-speed CPU memory. The packing and buffering device is responsible for this de-coupling.

This exemplary solution shown in FIG. 2 relies on a few assumptions:

1. Data transfers are packet oriented.
2. The packet size is either a known size or information about the size is given in a packet header prior to the data transfer. For the rest of this document, it will be assumed that a packet header is used.
3. For packet transmittals, this header is written to the low-speed device over the direct data path prior to the transfer of a packet. For receptions, the header is read from the low-speed device over the direct data path prior to a packet transfer.
4. The header information contains the number of bytes to be transferred, and thus enables all devices involved to monitor the data transfer to know when the packet transfer is complete.
5. An external DMA controller with "fly-by" capabilities transfers data to/from the packing and buffering device is advantageous, although this is not strictly necessary.

The high-speed packet data path is divided into two directions. One receive direction and one transmit direction. Both directions are selected and controlled by a control register.

The control register contains the following information:
1. Number of bytes to transfer.
2. Load counter bit. Loads an internal counter/decrementer when set.
3. Enable transfer. Chooses between high-speed data paths and low-speed direct data path. Initiates DMA transfer. (Interrupts from low-speed devices are disabled when this bit is set.)
4. Selects high-speed direction. Receive or transmit direction.
5. Selection of which low-speed device to access.

A counter/decrementer is provided to keep track on how many bytes that have been transferred. This counter is loaded when writing to the control register, and the load counter bit is set. This counter is common for both directions.

The receive path contains a RX_FIFO, two independent state machines, and a packing module. The state machines are the "RX_FIFO write state machine", and the "RX_FIFO read state machine". The FIFO has the same bus width as the low-speed device, and a register in the packing module has the same bus width as the high-speed CPU bus, in this case 32 bit.

The RX_FIFO write state machine controls the data transfer between the selected low-speed device and the FIFO. The state machine is configured by the control register and controlled by the byte counter and the FIFO full signal. The byte counter is decremented by the write state machine for each byte written into the FIFO. The write state machine will continue to write bytes into the FIFO until the counter reaches terminal count (TC) (counter value down to zero). The state machine is communicating with the low-speed device through chip select, read/write strobes, interrupt lines and address lines.

The RX_FIFO read state machine controls the packing of the bytes read from the FIFO to the 32-bit register in the packing module. The Read state machine checks the status of TC from the byte counter, to be able to stop reading bytes from the FIFO and flag that the register is filled even if the 32-bit register is not filled. This happens when the transfer is not modulo of four bytes. The same state machine is communicating with the CPU's DMA controller through the signals DMA request (DMA_REQ) and DMA acknowledge (DMA_ACK). When the transfer parameters has been configured, the DMA controller transfers data between the packing module and specific memory locations on the CPU bus. The state machine is controlling when to enable the output of the data in the packing module register on to the CPU bus. The state machine is configured by the control register and controlled by the FIFO empty signal, TC from the byte counter and DMA signals.

The transmit path contains a TX_FIFO, two independent state machines, and an unpacking module. The state machines are the "TX_FIFO write state machine", and the "TX_FIFO read state machine". The FIFO has the same bus width as the low-speed device, and a register in the unpacking module has the same bus width as the high-speed CPU bus, in this case 32 bit.

The TX_FIFO write state machine is communicating with the CPU's DMA controller through the signals DMA_REQ and DMA_ACK. When the transfer parameters has been configured, the DMA controller transfers data between specific memory locations on the CPU bus and the unpacking module. The write state machine controls the writing of the data from the high-speed CPU bus to the unpacking module 32-bit register, and the unpacking and writing of the data in the register into the FIFO. The write state machine is configured by the control register and controlled by the FIFO full signal and DMA signals. The byte counter is decremented by the write state machine for each byte written into the FIFO. The write state machine will continue get data from the CPU memory and to write bytes into the FIFO until the counter reaches terminal count (TC) (counter value down to zero).

The TX_FIFO read state machine controls the data transfer between the FIFO and the selected low-speed device. The read state machine is configured by the control register and controlled by the FIFO empty signal. The read state machine is communicating with the low-speed device through chip select, read/write strobes, interrupt lines and address lines. When TC is reached, and RX_FIFO is empty, DMA_IRQ is asserted, to indicate that the transfer is complete.

A status register is provided to report status of the packing and buffering device. The status register provides the following information:
1. Low-speed devices interrupt source information. Indicates the status of each low-speed device interrupt line.
2. Terminal count (TC) reached. (set when counter is zero)
3. RX_FIFO empty flag.
4. RX_FIFO full flag.
5. TX_FIFO empty flag.
6. TX_FIFO full flag.

The data transfer method according to the invention and its use by means of the packing and buffering device of the invention are described in more detail in the following.

In the following the transmit operation according to the invention is described in more detail.

Packet data transfer between the high-speed CPU memory and the low-speed device is accomplished in the following way:
1. The CPU receives a packet by some means. This package is to be transferred to a low-speed device.
2. The CPU writes header information down to the low-speed device using the direct data path.
3. The CPU initiates the CPU DMA controller for transmit data transfer.
4. The CPU writes transfer information down to the control register of the packing and buffering device. Low-speed device interrupts are masked.
5. The packing and buffering device TX_FIFO write state machine asserts DMA_REQ.
6. The CPU asserts DMA_ACK while starting a read operation from the dedicated buffer in the memory device on the CPU bus. The packing and buffering device de-asserts DMA_REQ when receiving DMA_ACK.
7. When data is ready from the memory device, the data is clocked into the unpacking module of the packing and buffering device.
8. DMA_ACK is de-asserted.
9. When the unpacking module has valid data, the TX_FIFO write state machine unpacks the data and writes them into the TX_FIFO.
10. The operations 5, 6, 7, 8 and 9 are repeated until the FIFO is full. If the FIFO is full, the state machine will wait for the FIFO to be ready for more data, and then continue. When the byte counter is down to zero, the state machine stops.
11. When and as long as data is ready in the FIFO, the TX_FIFO read state machine controls the transfer of the data from the FIFO to the selected low-speed device.
12. When the TX_FIFO is empty and the byte counter is down to zero, the packing and buffering device will assert an DMA_IRQ interrupt to the CPU, indicating that the packet transfer has completed.
13. The CPU then turns off the data packet path of the packing and buffering device by writing to the control register again. The low-speed device interrupts are again enabled and the direct data path through the packing and buffering device is enabled, ready for next transfer.

In the following the receive operation according to the invention is described in more detail.

Packet data transfer between the low-speed device and the high-speed CPU memory is accomplished in the following way:
1. The CPU gets an interrupt from one of the low-speed devices when the low-speed device has data to be transferred.
2. The CPU reads the status register in the packing and buffering device, to find the source of the interrupt.
3. The CPU reads the packet header information from the low-speed device, and initiates the DMA controller for the data transfer.
4. The CPU configures the packing and buffering device by writing to its control register. (Setting up the number of bytes to be transmitted, selection of low-speed device to be accessed and the data transfer direction.)
5. The packing and buffering device masks off the interrupts from the low-speed devices, and starts to transfer data from the selected low-speed device to the RX_FIFO, controlled by the RX_FIFO write state machine. The state machine asserts the necessary signals to the selected low-speed device, to read the data into the FIFO. This state machine is controlled by the byte counter and the RX_FIFO full signal. It will continuously move data into the FIFO, until the FIFO is full or TC is reached. If the FIFO is full, the state machine will wait for the FIFO to be ready for more data and then continue until TC is reached.
6. The RX_FIFO read state machine is reading data out of the FIFO and writing the data into the packing module register. The data is packed to fit to the high-speed CPU bus width. When the register is filled and ready, the state machine asserts the DMA_REQ signal to the CPU.
7. The CPU responds to the DMA_REQ signal by asserting DMA_ACK, and starts a write sequence to the dedicated buffer in the memory device on the CPU bus.
8. The RX_FIFO read state machine enables the delivery of data from the packing module register to the CPU bus during reception of the DMA_ACK signal, and de-asserts DMA_REQ. The data is then written directly into the memory location of the CPU bus memory device.

9. DMA_ACK is de-asserted.

10. The operations 5, 6, 7 and 8 are repeated over until the FIFO is empty and the byte counter is down to zero.

11. The CPU DMA controller is also counting the number of bytes transferred, and gives an interrupt when the transfer is complete. The CPU then turns off the packet data path of the packing and buffering device by writing to the control register again. The low-speed device interrupts are again enabled and the direct data path through the packing and buffering device is enabled, ready for next transfer.

Although the exemplary embodiments used heretofore to describe the invention are systems with bus widths of 8 bits and 32 bits, the invention shall not be construed as limited by these exemplary embodiments, but can equally well be utilised for other bus-widths and other configurations. The invention may further be combined with bursting over the high-speed bus and thus be offloading the high-speed bus even further, thus improving system performance even further. Also, the external DMA controller may be incorporated in the packing and buffering device, thus making it easier to scale further (by having no shared resources) and to utilise the invention in situations where an external DMA controller is unavailable.

Having by the herein provided descriptions illustrated the preferred embodiments of the present invention, those skilled in the art will realise that many variations are possible which are still within the scope and spirit of the present invention. The invention, therefore, is only limited as indicated by the claims.

List of applicable abbreviations:

CPU Central Processing Unit
DMA Direct Memory Access
ACK Acknowledge
REQ Request
DSP Digital Signal Processor
FIFO First In First Out
IO Input/Output
IRQ Interrupt request
S/M State machine
Rx Receiver
TC Terminal count (counter value down to zero)
Tx Transmitter

What is claimed is:

1. A method for use in a data processing system for transferring a data packet between a data processing unit (DPU) having a first data bus of a first bus width operating at a first speed and a data device having a second data bus of a second bus width operating at a second speed, the data packet including a plurality of data bytes and a header including information about packet size, the system including (1) data packet transfer circuitry (DTC) providing a buffered packet path between the first bus and the second bus and (2) a direct data path between the first bus and the second bus separate from the buffered packet path, the method comprising:

a) transferring, via the direct data path, packet size information from the data device to the DPU prior to transfer of packet data bytes associated with the packet size information over the buffered packet path;

b) setting a DTC byte counter based on the packet size information;

c) receiving from the data device, via the second data bus and the buffered packet path, receive data bytes and feeding the receive data bytes to a DTC receive buffer;

d) decrementing the DTC byte counter according to the number of receive data bytes;

e) repeating steps c) and d) until the DTC byte counter reaches a terminal count;

f) transferring the receive data bytes from the DTC receive buffer to a DTC packing buffer having a byte-width corresponding to the first bus width until the packing buffer is filled or the DTC byte counter reaches the terminal count; and g) transferring from the DTC packing buffer to the DPU, via the first data bus and the buffered packet path, data bytes stored in the DTC packing buffer, wherein the DTC receive buffer and DTC packing buffer define the buffered data packet transfer path separate from the direct data path.

2. The method according to claim 1, further comprising:

receiving, storing, and decoding control information from the DPU to control the transfer of data packets.

3. The method according to claim 1, further comprising:

transferring data blocks according to the smallest of the bus widths using the direct data path.

4. The method according to claim 1, further comprising:

in a receive direction, controlling the receipt from the second data bus and temporary storage in the receive buffer, which is a First-In-First-Out (FIFO) receive buffer, of the receive data bytes using a first state machine and controlling the transfer from the receive FIFO buffer to the packing buffer and from the packing buffer to the first data bus of the receive data bytes using a second state machine; and, in a transmit direction, controlling receipt of transmit data bytes from the first data bus and transfer from an unpacking buffer to a transmit FIFO buffer of transmit data bytes using a third state machine and controlling temporary storage in the transmit FIFO buffer and transfer from the transmit FIFO buffer to the second data bus of the transmit data bytes using a fourth state machine.

5. The method according to claim 4, further comprising:

controlling the first, second, third and fourth state machines using a common byte counter register.

6. The method according to claim 1, further comprising:

transferring from the first data bus to the second data bus the data packet header via the direct data path.

7. The method according to claim 1, further comprising:

initiating a data packet transfer upon an initiative signalled by the DPU or the data device.

8. A method for use in a data processing system for transferring a data packet between a data processing unit (DPU) having a first data bus of a first bus width operating at a first speed and a data device having a second data bus of a second bus width operating at a second speed, the data packet including a plurality of data bytes and a header including information about packet size, the system including (1) data packet transfer circuitry (DTC) providing a buffered packet path between the first bus and the second bus and (2) a direct data path between the first bus and the second bus, the method comprising:

a) transferring, via the direct data path, packet size information from the DPU to the data device prior to transfer of packet data bytes associated with the packet size information over the buffered packet path;

b) setting a DTC byte counter based on the packet size information;

c) receiving from the DPU, via the first data bus and the buffered packet path, receive data bytes and feeding the receive data bytes to a DTC unpacking buffer having a byte-width corresponding to the first bus width;

d) transferring the receive data bytes from the DTC unpacking buffer to a DTC transmit buffer having a byte-width corresponding to the second bus width;

e) decrementing the DTC byte counter according to a number of receive data bytes until the DTC byte counter reaches a terminal count; and f) transferring the receive data bytes of the DTC transmit buffer via the second data bus to the data device, wherein the DTC unpacking buffer and the DTC transmit buffer define the buffered data packet transfer path separate from the direct data path.

9. The method according to claim 8, further comprising:
receiving, storing, and decoding control information from the DPU to control the transfer of data packets.

10. The method according to claim 8, further comprising:
transferring data blocks according to the smallest of the bus widths using the direct data path.

11. The method according to claim 8, further comprising:
in a receive direction, controlling receipt from the second data bus and temporary storage in a receive First-In-First-Out (FIFO) buffer of receive data bytes using a first state machine and controlling the transfer from the receive FIFO buffer to a packing buffer and from the packing buffer to the first data bus of the receive data bytes using a second state machine; and, in a transmit direction, controlling receipt of transmit data bytes from the first data bus and transfer from an unpacking buffer to the transmit buffer, which is a transmit FIFO buffer, of transmit data bytes using a third state machine and controlling temporary storage in the transmit FIFO buffer and transfer from the transmit FIFO buffer to the second data bus of the transmit data bytes using a fourth state machine.

12. The method according to claim 11, further comprising:
controlling the first, second, third and fourth state machines using a common byte counter register.

13. The method according to claim 8, further comprising:
transferring from the first data bus to the second data bus the data packet header via the direct data path.

14. The method according to claim 8, further comprising:
initiating a data packet transfer upon an initiative signalled by the DPU or the data device.

15. A data packet transfer device for use in a data processing system for transferring a data packet between a data processing unit (DPU) having a first data bus of a first bus width operating at a first speed and a data device having a second data bus of a second bus width operating at a second speed, the data packet including a plurality of data bytes and a header including information about packet size, wherein said data packet transfer device (PTD) is in communication with the first bus and the second bus and is part of a buffered data packet path, comprising:

a first controller for transferring, via the direct data path between the first bus and the second bus separate from the buffered data packet path, packet size information from the data device to the DPU prior to transfer of packet data bytes associated with the packet size information over the buffered packet path;

a byte counter set with a count value based the packet size information;

a second controller for receiving from the data device, via the second data bus, receive data bytes and feeding the receive data bytes to a receive buffer;

a third controller for decrementing the byte counter according to a number of receive data bytes until the byte counter reaches a terminal count;

a fourth controller for transferring the receive data bytes from the receive buffer to a packing buffer having a byte-width corresponding to the first bus width until the packing buffer is filled or the byte counter reaches the terminal count; and a fifth controller for transferring from the packing buffer to the DPU, via the first data bus, data bytes stored in the packing buffer, wherein the receive buffer and packing buffer define the buffered data packet transfer path separate from the direct data path.

16. A data packet transfer device according to claim 15, wherein the second and fourth controllers include a first state machine and a second state machine, respectively.

17. A data packet transfer device according to claim 15, wherein the first, third, and fifth controllers correspond to a control and status module.

18. A data packet transfer device according to claim 15, wherein the third controller is configured to receive a count value from the DPU.

19. A data packet transfer device according to claim 15, wherein the data packet transfer device permits transfer of data packets between the data device and the DPU without requiring use of DPU resources during the data packet transfer.

20. A data packet transfer device according to claim 15, further comprising:

a sixth controller for receiving and storing transmit data bytes from the first data bus in an unpacking buffer;

a seventh controller for transferring from the unpacking buffer to a transmit FIFO buffer of transmit data bytes;

an eighth controller for transferring from the transmit FIFO buffer to the second data bus the transmit data bytes.

21. A data packet transfer device according to claim 20, wherein the seventh and eighth controllers include corresponding state machines.

22. A data packet transfer device for use in a data processing system for transferring a data packet between a data processing unit (DPU) having a first data bus of a first bus width operating at a first speed and a data device having a second data bus of a second bus width operating at a second speed, the data packet including a plurality of data bytes and a header including information about packet size, wherein said data packet transfer device (PTD) is in communication with the first bus and the second bus and is part of a buffered data packet path between the first bus and the second bus, comprising:

a first controller for transferring, via the direct data path separate from the buffered data packet path, packet size information from the DPU to the data device prior to transfer of packet data bytes associated with the packet size information over the buffered packet path;

a byte counter set with a count value based the packet size information;

a second controller for receiving from the DPU, via the first data bus, receive data bytes and feeding the receive data bytes to an unpacking buffer having a byte width corresponding to the first bus width;

a third controller for transferring the receive data bytes from the unpacking buffer to a transmit buffer having a byte width corresponding to the second bus width;

a fourth controller for decrementing the byte counter according to a number of receive data bytes until the byte counter reaches a terminal count; and a fifth controller for transferring the receive data bytes of the transmit buffer via the second data bus to the data device, wherein the unpacking buffer and the transmit buffer define the buffered data packet transfer path separate from the direct data path.

23. A data packet transfer device according to claim 22, wherein the third and fifth controllers include a first state machine and a second state machine, respectively.

24. A data packet transfer device according to claim 22 wherein the first, second, and fourth controllers correspond to a control and status module.

25. A data packet transfer device according to claim 22 wherein the fourth controller is configured to receive a count value from the DPU.

26. A data packet transfer device according to claim 22 wherein the data packet transfer device permits transfer of data packets between the data device and the DPU without requiring use of DPU resources during the data packet transfer.

27. A data packet transfer device according to claim 22, further comprising:

a sixth controller for receiving and storing receive data bytes from the second data bus in a receive FIFO buffer;

a seventh controller for transferring from the FIFO receive buffer to a packing buffer of receive data bytes;

an eighth controller for transferring from the packing buffer to the first data bus the receive data bytes.

28. A data packet transfer device according to claim 27, wherein the sixth and seventh controllers include corresponding state machines.

* * * * *